United States Patent [19]

Huggler

[11] 4,201,124
[45] May 6, 1980

[54] TEMPERATURE SENSITIVE TIMING DEVICE FOR TOASTER APPLIANCE

[75] Inventor: Peter E. Huggler, Columbia, Mo.

[73] Assignee: McGraw-Edison Company, Elgin, Ill.

[21] Appl. No.: 881,612

[22] Filed: Feb. 27, 1978

[51] Int. Cl.² ............................................. A47J 37/08
[52] U.S. Cl. ........................................ 99/327; 99/385; 99/391
[58] Field of Search ................. 99/325, 327, 328, 329, 99/346, 385, 389–390, 391; 219/524, 525

[56] References Cited

U.S. PATENT DOCUMENTS

| | | | |
|---|---|---|---|
| 2,720,156 | 10/1955 | Theisen | 99/329 R |
| 2,778,902 | 1/1957 | Visos | 99/329 R |
| 2,818,011 | 12/1957 | Fleming et al. | 99/329 R |
| 2,865,279 | 12/1958 | Palmer | 99/329 R |
| 2,910,929 | 11/1959 | Sorenson | 99/329 R X |

Primary Examiner—Harvey C. Hornsby
Assistant Examiner—Arthur O. Henderson
Attorney, Agent, or Firm—Ronald J. LaPorte; Jon C. Gealow; Dale A. Kubly

[57] ABSTRACT

A temperature sensitive timing control device for a toaster appliance includes a main bimetal element and a compensating bimetal element, both mounted on a support member mounted for pivotal movement in first and second directions, but biased toward the first direction. The main bimetal element includes a trigger arm normally engaging a latch release member to maintain the member in a set position. The latch release member when released by the trigger arm, in turn releases the bread carrier latch mechanism. The free end of the compensating bimetal element rests on a limiting screw which determines the extent of movement of the support member in the first direction. A locking member, operated by the toaster bread carrier when the latter is moved into a toasting position, engages the support member to secure it against movement in the first direction. When the bread carrier is moved to the toasting position, the bimetal elements are heated. The main bimetal element moves the trigger arm in a direction opposite the first direction of movement of the support member, out of engagement with the latch release member, permitting the latter to release the bread carrier latch mechanism for movement of the bread carrier to the nontoasting position and to cause the locking member to be disengaged from the support member. The compensating bimetal when heated, moves away from the limiting screw to permit the released support member to move in the first direction, repositioning the trigger arm of the main bimetal into engagement with the latch release member which is reset by the bread carrier as it returns to the nontoasting position, thereby permitting virtually immediate initiation of the next toasting cycle.

14 Claims, 5 Drawing Figures

TEMPERATURE SENSITIVE TIMING DEVICE FOR TOASTER APPLIANCE

BACKGROUND OF THE INVENTION

This invention relates generally to temperature sensitive timing control devices for a toaster or the like appliance and more particularly to such a device employing both main and compensating heat sensitive bimetal elements for controlling the toasting time in a toaster appliance.

In conventional bread toasters of the "pop up" variety, which use a bimetal element heated by the bread being toasted to release a latch mechanism maintaining the bread carrier in a lowered position, the second, third, etc. toasting cycles, if instituted rather close in time to one another, tend to render the bread continually lighter in color. The latter occurs because the bimetal element controlling the time of the toasting cycles is not given sufficient time to cool between the cycles and as such subsequent toasting periods are shortened To compensate for the above, compensating bimetal elements have been provided which respond to the toaster cavity temperature during the toasting cycle and act against the movement of the main bimetal element to force the latter to bend an even greater distance on subsequent cycles to release the bread carrier. In this fashion, the length of successive toasting cycles are controlled such that the toast color is maintained relatively constant. Such a compensating bimetal element arrangement is described in U.S. Pat. No. 3,350,997.

While arrangements such as that described heretofore for the most part, solve the problem of uneven duration of toasting cycles, they tend to upset the "reset time" of the toaster. The "reset time" is herein defined as the time required after a toasting cycle has been completed and the latching mechanism has becomes reengaged for use during subsequent toasting cycles. Too long a reset time is generally considered objectionable to a user.

One method used to avoid the reset time problem is to choose a main bimetal element which is relatively small in size and to provide a shield or additional member to absorb heat therefrom, thereby to more rapidly cool the bimetal element and thus permit it to return to a "reset" condition more quickly. Such arrangements are illustrated in U.S. Pat. Nos. 2,865,279 and 3,035,509. The drawback to the last-described devices, however, is that the size of the bimetal element makes it relatively "weak", thereby not being able to supply sufficient force to release the bread carrier latching machanism. Consequently, a more complex and costly latch release arrangement may be required to provide such force.

SUMMARY OF THE INVENTION

Accordingly, it is a primary object of the present invention to provide a new and improved temperature sensitive toaster timing control device which employs both main and compensating bimetals and which overcomes the disadvantages of the prior art arrangements described and provides both substantially uniformly timed toasting cycles as well as a relatively short reset time between cycles.

A further object of the present invention is to provide a new and improved temperature sensitive toaster timing control device of the above-described type which is simple in construction, yet efficient in operation and relatively inexpensive to fabricate.

Briefly, a preferred embodiment of the temperature sensitive toaster timing control device according to the invention includes a main bimetal element mounted on a pivotal bracket. The bracket is biased in a first direction opposite from the direction of movement of the main bimetal element when heated. A compensating bimetal element is also mounted on the bracket and when heated tends to bend also.

The free end of the compensating bimetal element rests on an adjustable set screw which limits the movement of the bracket in the first direction. A locking spring is positioned for engagement of the bracket upon lowering of the bread carrier to the latched position.

In operation, upon lowering the bread carrier and energizing the toaster heating elements, both the main and compensating bimetal elements are heated and bend respectively. The main bimetal element is bent eventually to a point whereat the bread carrier latching mechanism is released to permit the bread carrier to be raised to its upper position. When heated the compensating bimetal element is lifted off of the limiting set screw. However, prior to the release of the bread carrier by the main bimetal element, the bracket which is biased in the first direction cannot be moved because of the locking spring engaged therewith.

Upon release of the bread carrier, the locking spring is also released, permitting the bracket to pivot in the first direction opposite the direction of movement of the main bimetal element. In this fashion the main bimetal element, prior to cooling, is returned to the position in which it resets the latch release mechanism and thereby provides a relatively short reset time for the toaster.

In the event successive toasting cycles are initiated relatively quickly, the reset times of several of the successive cycles will be substantially as short as the first. Thereafter, however, when the compensating bimetal reaches its bending limit due to the heating thereof during the toasting cycles, the reset time increases to a length substantially as it would have been if the "locked up" compensating bimetal were not employed.

DETAILED DESCRIPTION OF THE DRAWINGS

Figure 1:
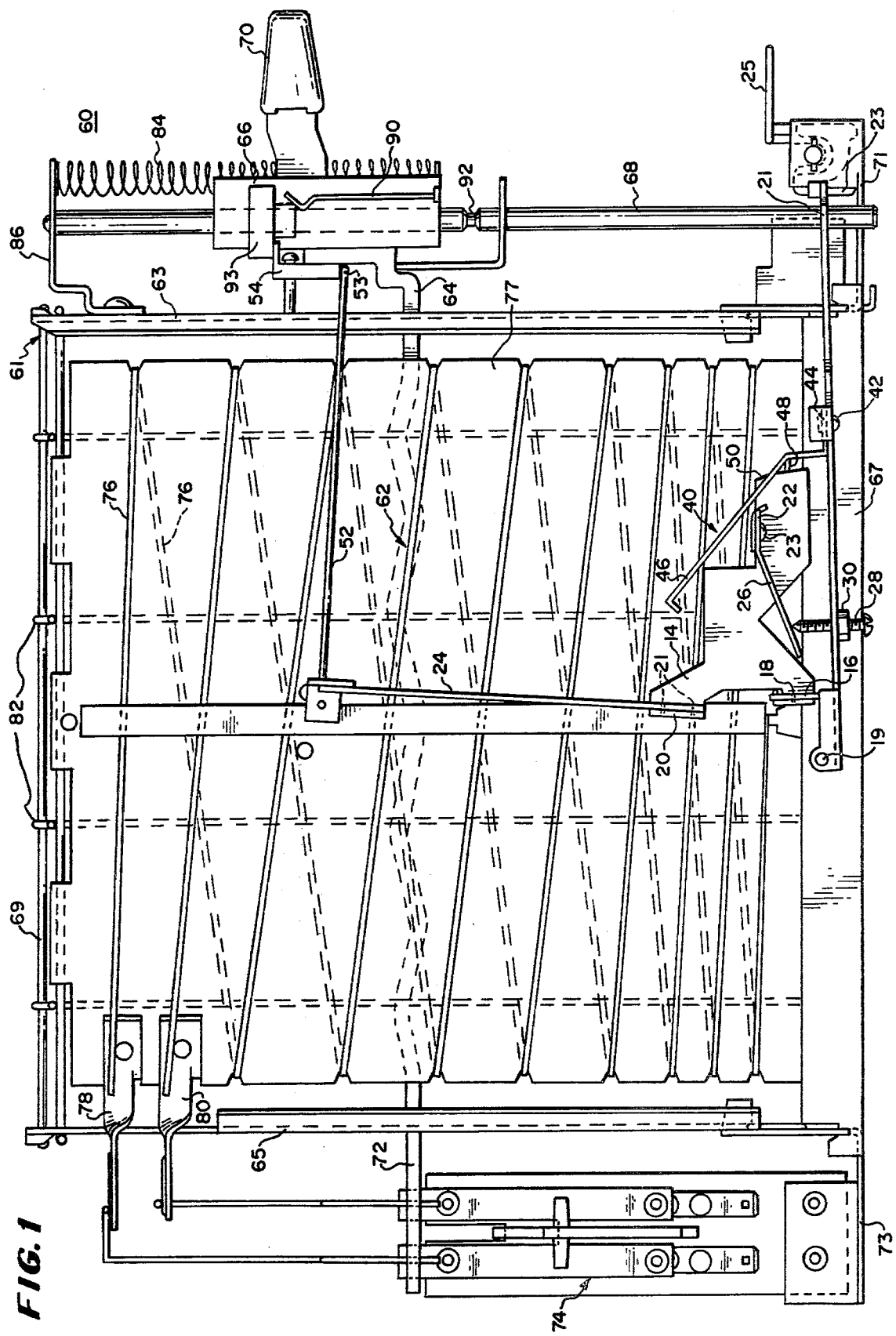
FIG. 1 is a side view (with covers removed) of a bread toaster appliance including a temperature sensitive toaster timing control device according to the invention.
Figure 2:
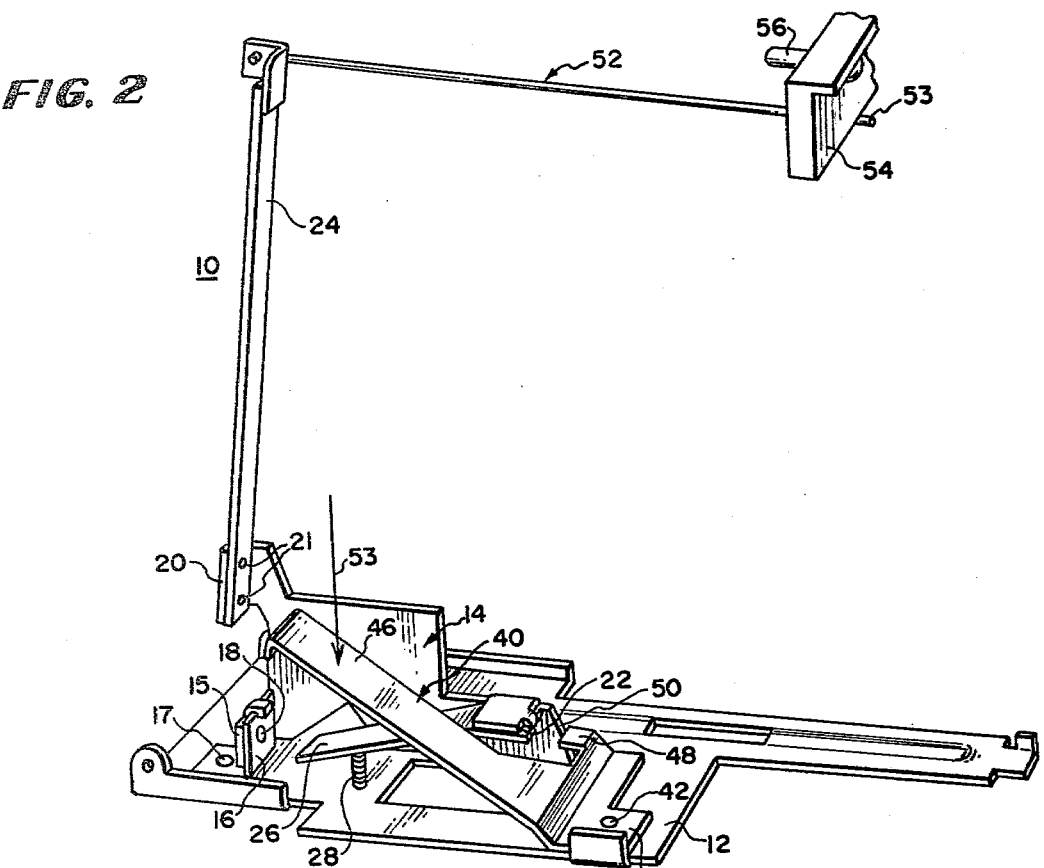
FIG. 2 is a perspective view of the temperature sensitive toaster timing control device of FIG. 1 including a main bimetal element and a locked out compensating bimetal element according to the invention.

Referring now to the drawings in greater detail wherein like numerals have been employed throughout the various views to designate similar components, a toaster appliance designated generally by the numeral 60 which includes a temperature sensitive toaster timing control device 10 according to the invention, is illustrated in FIG. 1. The outer covers of the toaster appliance have been removed to show the interior of the appliance and the location of the control device 10 therein.

The toaster appliance comprises a frame 61 having side walls 63, 65 joined by a base wall 67 and upper support members 69, respectively. A bread carrier 62, of a conventional type, shown for the most part in dotted lines, which receives a slice of bread to be toasted is positioned within the frame and is mounted for vertical movement between raised and lowered positions. The carrier is attached at a first end 64 to a member 66 mounted for sliding movement vertically along a support rod 68, the rod being mounted at the side of the toaster between support arm 86 extending from wall 63 and an extension 71 of the base wall. A handle 70 attached to member 66 extends outwardly from the toaster cover (not shown). The handle is depressed by an operator to lower the carrier within the toaster frame. The opposite end 72 of the bread carrier extends outwardly through wall 65 for engagement of contacts 74 mounted at the opposite side of the toaster appliance on base wall extension 73, adjacent wall 65 of the frame.

The contacts 74 are coupled at terminals 78, 80, with the heating element 76 which is wrapped about an insulative mica or the like sheet 77 extending vertically within the toaster frame, adjacent the bread carrier and to a source of electrical power, closing the contacts causes the element 76 to be heated. The insulative sheets on which the heating elements are mounted are positioned on opposite sides of the bread carrier so as to toast both sides of a slice of bread received in the appliance.

Vertically extending metal bread guides 82 are provided at spaced intervals between the bread slice and heating elements to prevent the former from engaging the latter when the carrier is lowered during a toasting cycle. In the toaster appliance illustrated, the member 66, when lowered during a toasting cycle, is latched against the force of a return spring 84 coupled between the member and support member 86. The latch mechanism includes a leaf spring latch member 90 attached to the member 66 and movable therewith. Upon moving member 66 to a lowered position, the latch member 90 engages a recess 92 in rod 68 to secure the bread carrier against upward movement by spring 84. The latch mechanism holds the member and the bread carrier in a lowered position during the toasting cycle. A resettable latch release member 54 is mounted for pivotal movement on the side wall 63 of the toaster frame. The release member 54 is constructed so as to be biased by gravity toward a release condition (FIG. 4) to initiate the release of the carrier latch mechanism. When the member 54 is released, a member 93 is likewise released for engagement with the latch member 90 so as to disengage the member from recess 92, thereby permitting the bread carrier to be returned by spring 84 to a raised position. The member 93 and latch release member 54 are restored to a raised position as the member 66 is moved upwardly along rod 68. This is accomplished by means of structure not illustrated in the drawing. In order to maintain the member 93 in a raised position when the member 66 and bread carrier are lowered for the next toasting cycle, the member 54 must be secured in a set position shown in FIG. 1. To do so, a trigger wire 52 controlled by the temperature sensitive toaster timing control device 10 according to the invention engages member 54 after it has been pivoted into a raised position but before the carrier is again lowered. If the trigger wire does not engage the member 54 to maintain it in a set position prior to the lowering of carrier 66 to a latched position, member 93 will when the carrier is lowered, follow the carrier to such position and will then be unavailable for disengaging the latch member 90. As such damage to the toaster appliance might occur.

The temperature sensitive toaster timing control device 10 according to the invention provides a virtual instant reset of member 54 upon raising bread carrier 62 after the completion of a toasting cycle. As such the last mentioned condition is avoided.

Figure 3:
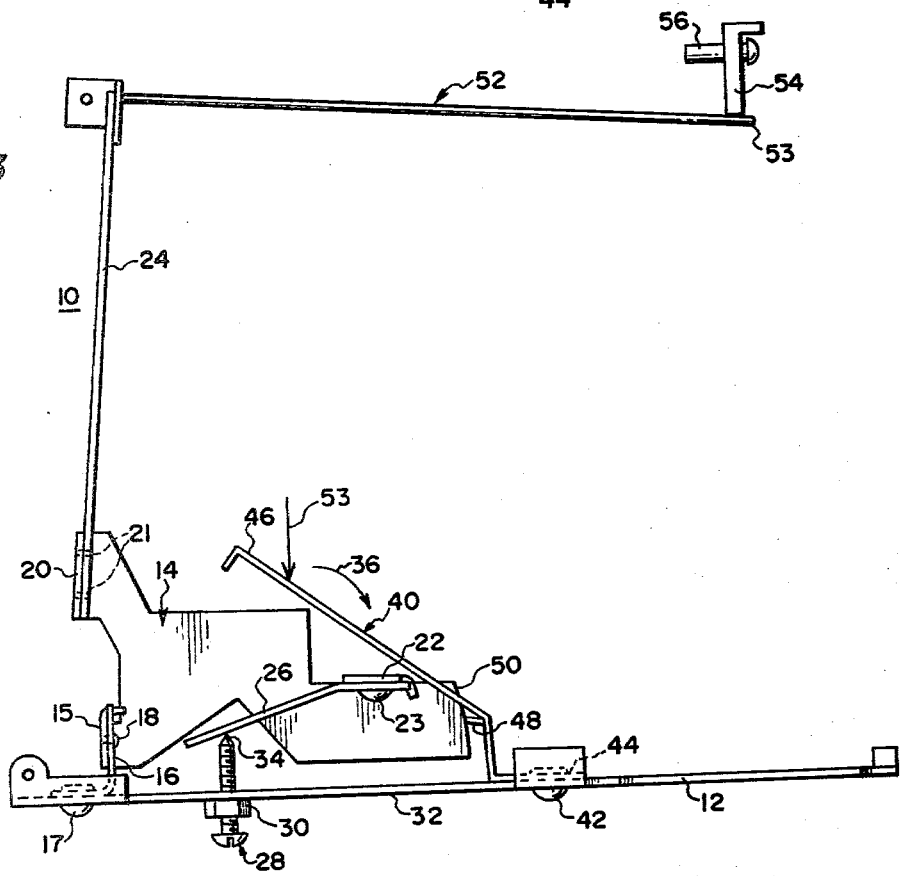
FIG. 3 is a side view of the toaster timing control device of FIG. 1 shown in the first, locked condition.
Figure 5:
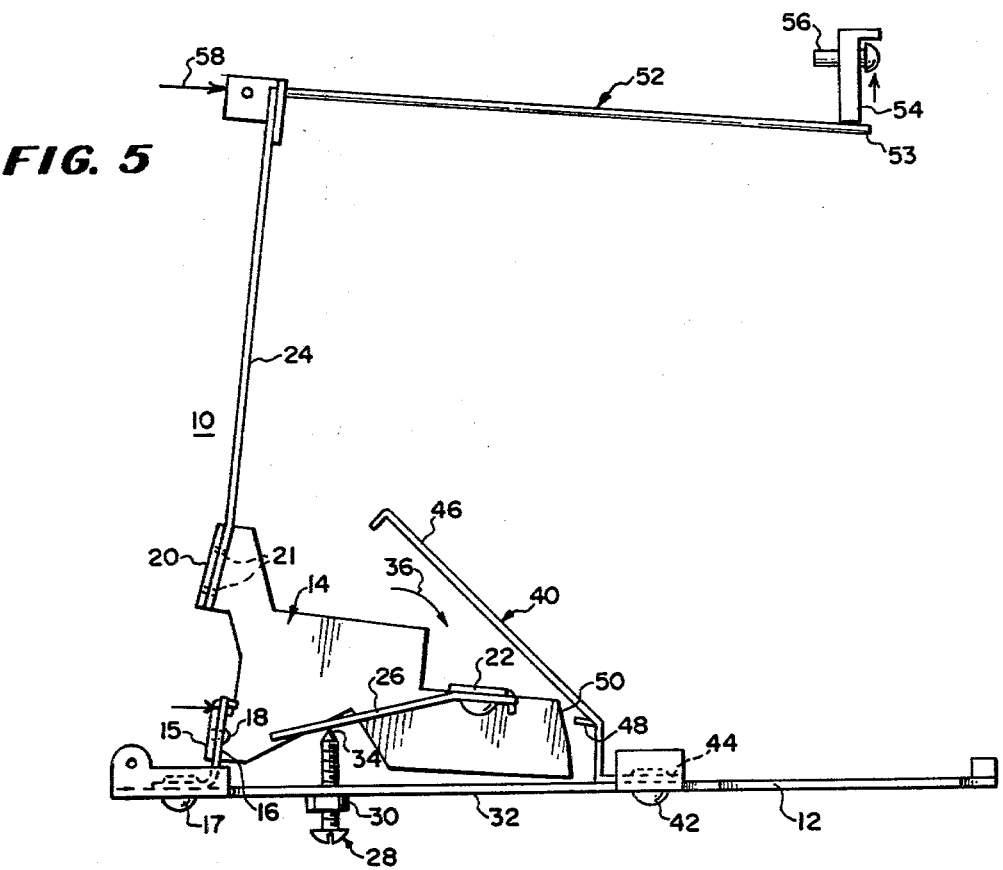
FIG. 5 is a side view of the toaster timing control device of FIG. 1 shown in a reset condition subsequent to the completion of the toasting cycle.

A preferred embodiment of the temperature sensitive toaster timing control device 10 according to the invention is shown in the figures of the drawings. The timing control device includes a mounting bracket 12 attached to the base wall 67 of frame 61 of the toaster appliance. The left hand side of the bracket 12 as viewed in the drawing is attached for pivotal movement about fastener pin 19. The opposite end 21 of the bracket rests on a slidable cam member 23 movable manually by arm 25 extending outwardly from the toaster appliance. Movement of arm 25 changes the position of cam member 53 with respect to end 21 of the bracket so as to pivot the bracket 12 and bimetal elements of the toaster timing control device 10 about pin 19 and as will be seen hereinafter, adjust the toasting cycle time of the toaster appliance. Mounted on the bracket 12 at the left hand side thereof as viewed in the figures of the drawings, is a bimetal element support member 14. The support member 14 is attached at an arm 15 thereof to one leg of an L-shaped leaf spring 16 which in turn is attached at the other leg thereof to the bracket 12. Attachment of the members as described is made with suitable fasteners 17, 18 such as rivets or screws. The leaf spring 16 which is the sole support for member 14, normally biases the member 14 in a first direction, clockwise as depicted by arrow 36 in FIGS. 3 and 5 of the drawings.

Joined to second and third arms 20, 22, of the support member 14 by suitable fasteners 23, 21 respectively, is a main bimetal element 24 and a compensating bimetal element 26, respectively. In the embodiment of the timing control device shown in the drawings, main bimetal element 24 is elongate, approximately 3″ in length and extends generally vertically from the support member 14, while compensating bimetal 26 is shorter, approximately one inch in length and extends generally horizontally. The sensitivity of the elements, that is the amount which the elements will bend when subjected to heat, differs in the preferred embodiment of the device. In the preferred one, element 26 bends approximately twice the amount of element 24 for an equal application of heat.

The arrangement, size, length, position, etc. of the elements, it will be understood by one skilled in the art, can be altered as desired while still being encompassed fully within the scope of the subject mentioned.

Also attached to bracket 12 of the control device 10 is a limiting means taking the form of a screw 28. The last-mentioned screw extends through bracket 12 and is received in a mating nut 30 joined to the lower wall 32 of the bracket so that the screw can be incrementally adjusted to lengthen or shorten the toaster reset time as desired. The free end 34 of the screw member is positioned for engagement with the compensating bimetal element 26 and thereby limits the pivotal movement of the support member 14 including elements 24, 26, in the first direction as shown in the drawings by arrow 36.

A locking spring assembly 40 is also mounted on bracket 12 near the right hand side thereof as shown in the drawings. The locking spring assembly 40 is attached to the bracket by means of a suitable fastener 42 at the first end 44 of the assembly. An elongated leaf spring arm 46 extends from the assembly at a predetermined angle with respect to the bracket 12. A second, shorter, stiffer arm 48 extends in the same direction as leaf spring arm 46 toward a curved cam surface 50 at the free end of the bimetal element support member 14. The locking spring assembly is biased upwardly as shown in the drawings so that normally arm 48 and cam surface 50 are not engaged.

Trigger wire 52 extends outwardly from the free end of the main bimetal element 24 as shown in the drawings. The free end 53 of the trigger wire extends through an opening in wall 63 of frame 61 and normally engages resettable latch release member 54 mounted on pin 56 for pivotal movement thereabout. The member 54 as described heretofore, is released upon disengagement of trigger wire 52 therewith to permit the member to pivot and thereby permit member 93 to be dropped along rod 68 thereby to delatch the lowered bread carrier which is thereafter returned to a raised position by means of coil spring 84.

A description of the operation of the temperature sensitive toaster timing control device 10 will be helpful in understanding the interrelation of the components thereof previously described.

Initially, the control device is at rest with bimetal elements 24, 26 at room temperature. In a rest position, arm 48 of the locking spring assembly is disengaged from the cam surface 50 of the bimetal element support member 14.

Upon lowering the bread carrier 62 in the toaster appliance in the direction of the arrow 53 (to a latched, toasting position), the carrier engages arm 46 of the locking spring, forcing it downwardly and at the same time causing arm 48 to engage cam surface 50, thereby locking the support member 14 in the position which it had upon lowering the bread carrier. At this time latch spring 90 is received in recess 92 of rod 68 to maintain the carrier in the lowered position.

Figure 4:
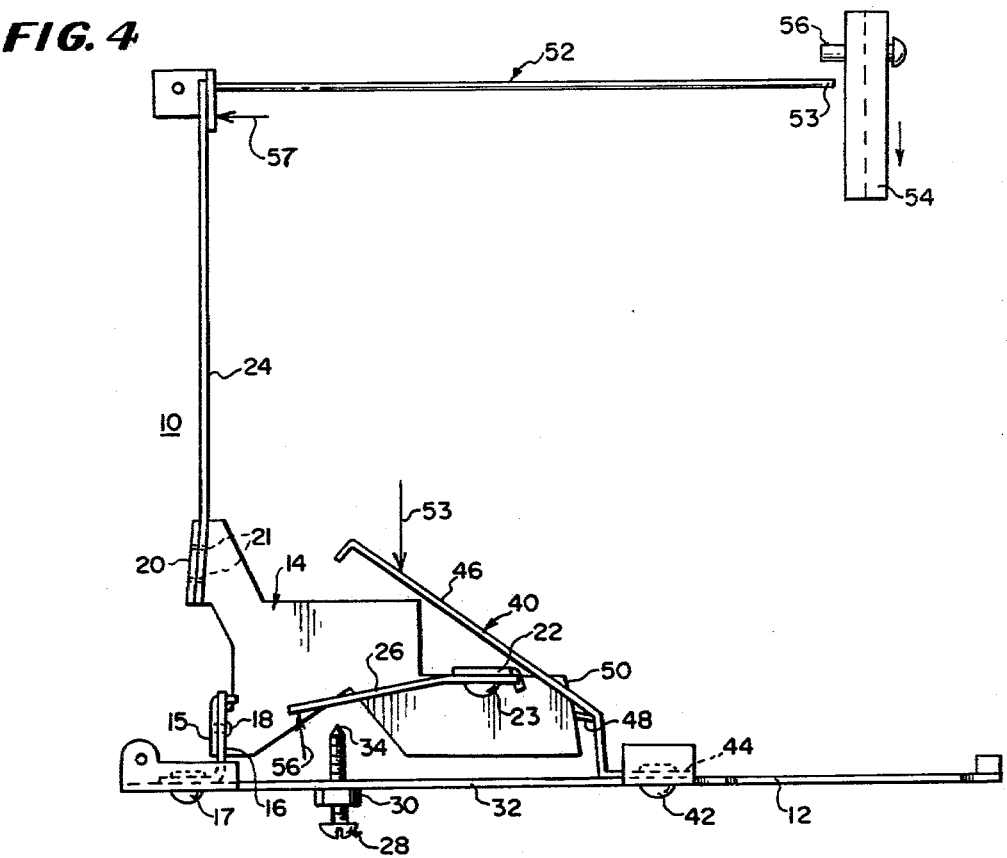
FIG. 4 is a side view of the toaster timing control device of FIG. 1 shown in a condition subsequent to the heating of a bread slice(s) immediately before the release of the bread carrier latching mechanism (not shown)

End 72 of the bread carrier engages contacts 74 to energize the toaster heating elements 76 thereby to heat the bread cavity so as to toast the bread slice previously received in the bread carrier. In turn, main bimetal element 24 is heated so that the element begins to bend in the direction of arrow 57 (FIG. 4). Simultaneously therewith, compensating bimetal element 26 is heated and begins to bend in the direction of arrow 56 (FIG. 4), lifting away from the end 34 of limiting screw 28. It should be noted that at this time support member 14 is not pivoted in the direction of arrow 36 by the biasing force of spring 16 as the support member is being held in a fixed position by means of arm 48 of the locking assembly which remains in engagement with cam surface 50 of the support member so long as the bread carrier is in a toasting position.

When bimetal element 24 has bent sufficiently in the direction of arrow 57 causing end 53 of the trigger wire to release the latch release member 54, the latter is permitted to pivot about pin 56 to the position shown in FIG. 4. In turn, member 93 is released to slide downwardly due to gravity along rod 68 for engagement with spring 90, causing spring 90 to become disengaged from recess 92 in rod 68, thereby permitting spring 84 to drive the bread carrier rapidly upwardly to the normal, non-toasting position, out of engagement with arm 46 of the locking spring assembly. Raising the bread carrier to its normal position returns latch release member 54 and member 93 to the toast reset position shown in FIG. 1. Virtually, at the same time, biasing spring 16 pivots support member 14 in the direction of arrow 36 to drive the main bimetal element 24 and trigger wire 52 in the direction of arrow 58 (FIG. 5) to reposition end 53 of the trigger wire into engagement with the reset latch release member 54, thereby securing the members 54 and 93 in their raised positions. The support member is pivoted a predetermined distance determined by the extent of bending of the compensating bimetal 26. The travel of the support member in the direction of arrow 36 is once again limited by screw 28. Immediately, the toaster is in condition for receiving bread slices to be toasted during the next toasting cycle. It should be noted that it is not necessary to wait until the bimetal elements cool before resetting of the latch release member 54 is accomplished.

As can be seen from the above description of the operation of the temperature sensitive timing control device according to the invention, the reset time of the toaster appliance is virtually instantaneous. It is not necessary, at least for several successive toasting cycles, even if initiated rapidly, to wait until the main bimetal element 24 cools before a resetting of the latch release member 54 takes place.

It should be pointed out that eventually if a number of toasting cycles is initiated sufficiently rapidly, the compensating bimetal element will have bent to its limit and as such resetting of the trigger wire to engage latch release member 54 in its reset position, will depend upon the cooling of the bimetal elements. In practical application, however, this stage should not be reached.

While a particular embodiment of the temperature sensitive timing control device according to the invention has been shown and described, it will be obvious to one skilled in the art that many modifications therein may be made. It is therefore contemplated to cover by the present application any and all such modifications that fall within the spirit and scope of the appended claims.

I claim:

1. In a toaster appliance including housing means defining a bread toasting cavity, a bread carrier for conveying slices of bread and the like to be toasted movable between toasting and nontoasting positions, to position said bread slices into and out of said toasting cavity, respectively, means biasing said carrier to said nontoasting position, latch means for holding said carrier in said toasting position against the force of said biasing means, said latch means including resettable latch release means operable between set and released positions for releasing said latch means thereby permitting said carrier to be moved from said toasting to said nontoasting position, said latch release means being operable to said set position in accordance with the return of said carrier to said nontoasting position and heating means operable upon said carrier being moved to said toasting position for toasting said bread slices carried in said carrier, a temperature sensitive timing device for controlling the length of said toasting cycle and the positioning of said latch release means between said set and released positions, said device including:
- a support member mounted on a base member for pivotal movement in first and second directions with respect to said base member, means biasing said support member in said first direction, first and second bimetal elements mounted at opposite ends of and on said support member, each said bimetal element being bendable at a predetermined rate in a predetermined direction upon heating, said first bimetal element being bendable in a direction opposite from said first direction of movement of said support member and normally being positioned for maintaining said latch release means in said set position,
- limiting means engageable with said second bimetal element for limiting the movement of said support member in said first direction, said second bimetal element being bendable at a predetermined rate in a direction away from said limiting means when heated, and locking means mounted adjacent said support member, movable between a first normal position, out of engagement with said support member to a second locked position, into engagement with said support member in response to the movement of said bread carrier from said nontoasting to toasting position for securing said support member against movement by said biasing means in said first direction, said locking means releasing said support member for movement by said biasing means in response to the movement of said bread carrier from said toasting to said nontoasting position, said first and second bimetal elements bending in said predetermined directions, respectively, when heated in response to the operation of said heating means, said latch release means being movable to said released position upon said first bimetal element bending to a predetermined position, whereby said latch means is operable to release said bread carrier for movement from said toasting to said nontoasting position, said locking means releasing said bimetal element support member in response to the movement of said bread carrier toward said nontoasting position, whereby said support member moves in said first direction a predetermined distance determined by the repositioning of said second heated bimetal element with respect to said limiting means, whereby said first bimetal element is moved with said support member for holding said latch release means in said set position in preparation for a subsequent toasting cycle.

2. A toaster appliance as claimed in claim 1 wherein said locking means includes a member movable into and out of engagement with said bimetal element support member, but normally biased out of engagement therewith and wherein said locking member is positioned for engagement by said bread carrier when the latter is moved to a toasting position, whereby said locking member is moved thereby into locking engagement with said support member.

3. A toaster appliance as claimed in claim 1 wherein said limiting means include an adjustable member positioned for movement toward and away from said second bimetal element for adjusting the extent of movement of said support member in said first direction.

4. A toaster appliance as claimed in claim 1 wherein said first bimetal element includes an extension member coupled to the free end thereof, said extension member being engageable with said latch release means for maintaining the latter in said set position prior to said first bimetal element bending to said predetermined position and said extension member releasing said latch release means for movement to said released position in response to the bending of said first bimetal element to said predetermined position.

5. A toaster appliance as claimed in claim 4 wherein said temperature sensitive timing device includes a base member upon which said support member is mounted, said base member mounted for pivotal movement in said first and second directions, and elevation means positioned for engagement with the opposite end of said base member for movement between first and second positions for raising and lowering said opposite end of said base member thereby to pivot said support member in said first and second directions to lengthen or shorten, respectively, said toasting cycle.

6. A temperature sensitive timing device for controlling the length of the toasting cycle in a toaster appliance comprising a bread carrier for carrying bread slices and the like to be toasted, movable between toasting and non-toasting positions, means biasing said carrier to said non-toasting position, heating means for toasting said bread slices operable to a heated condition upon moving said bread carrier to said toasting position, latch means for holding said carrier in said toasting position against the force of said biasing means and resettable latch release means operable to a set position in preparation for the release of said latch means, and to a released position for releasing said latch means, thereby permitting said bread carrier, subsequent to the completion of the toasting cycle, to be returned to said nontoasting position,
- said temperature sensitive timing device including in combination:
- a support member mounted for pivotal movement in first and second opposing directions, and biased in said first direction,
- first and second bimetal elements mounted on said support member, each said bimetal element being bendable at a predetermined rate in a predetermined direction upon heating, said first bimetal element being bendable in a direction opposite said first direction of movement of said support member, and normally being positioned for maintaining said latch release means in said set position,
- limiting means engageable with said second bimetal element for limiting the pivotal movement of said support member in said first direction, said second bimetal element being bendable at a predetemined rate in a direction away from said limiting means when heated, and
- locking means mounted adjacent said support member, movable between a first unlocked position, out of engagement with said support member to a second locked position, in engagement with said support member, in response to the movement of said bread carrier from said nontoasting to said toasting position for securing said support member against pivotal movement in said first direction, said locking means releasing said support member for movement in response to the movement of said bread carrier to said non-toasting position, said latch release means being movable to said released position upon said first bimetal element bending a predetermined amount in said direction opposite said first direction of movement of said support member, whereby said latch means is operable to release said bread carrier for movement from said toasting to said non-toasting position, said bread carrier returning said latch release means to said set position and said locking means being movable to said unlocked position to release said support member for movement in said first direction in response to the release of said bread carrier, whereby said support member repositions said second bimetal heating element into engagement with said limiting means and said first bimetal element to said position for maintaining said latch release means in said set position in preparation for a subsequent toasting cycle.

7. A temperature sensitive timing device as claimed in claim 6 further including a base portion, biasing spring means for mounting said support member to said base portion, said biasing spring means biasing said support member pivotally on said base portion in said first direction, and wherein said first bimetal element extends from said support member in a first direction and said second bimetal element extends from said support member in a second direction and wherein said first bimetal element is bendable when heated in a direction opposite from the direction of movement of said second bimetal element when heated.

8. A temperature sensitive timing device as claimed in claim 7 wherein said base portion is mounted for pivotal movement about a first end thereof in the first and second opposing directions of movement of said support member, and further including means for adjusting the pivotal movement of said base portion, thereby to reposition said first bimetal element with respect to said latch release means for altering the length of said toasting cycle.

9. A temperature sensitive timing device as claimed in claim 7 further including a trigger arm coupled to the free end of said first bimetal element, said trigger arm normally engaging said latch release means in a predetermined relation for maintaining the latch release means in a set position, said trigger arm releasing said latch release means to said released position in response to said first bimetal element bending when heated, a predetermined amount in said direction opposite said first direction of movement of said support member.

10. A temperature sensitive timing device as claimed in claim 6 wherein said limiting means includes an adjustable stop member positioned for engagement with said second bimetal element to limit the pivotal movement of said support member in said first direction, said stop member being repositionable with respect to said second bimetal element for adjusting the position of said support member with respect to said first and second directions of movement.

11. A temperature sensitive timing device as claimed in claim 6 wherein said locking means includes a member normally biased away from said support member, movable into engagement therewith for securing said support member in a predetermined position, said locking member being engageable by said bread carrier in response to the latter being moved to said toasting position for urging said member into locking engagement with said support member, said locking member being released for movement out of engagement with said support member upon release of said bread carrier for movement to said non-toasting position.

12. A temperature sensitive timing device for controlling the length of the toasting cycle in a toaster appliance, comprising a bread carrier for carrying bread slices and the like to be toasted, movable between toasting and nontoasting positions, means biasing said carrier to said nontoasting position, heating means for toasting said bread slices operable to a heated condition upon moving said bread carrier to said toasting position, latch means for holding said carrier in said toasting position against the force of said biasing means and resettable latch release means operable to a set position in preparation for the release of said latch means and to a released position for releasing said latch means, thereby permitting said bread carrier, subsequent to the completion of the toasting cycle to be returned to said nontoasting position, said temperature sensitive timing device including in combination:

a support member mounted on a base member for pivotal movement in first and second opposing directions with respect to said base member, means biasing said support member in said first direction, first and second bimetal elements mounted near said heating means, each said element being bendable at a predetermined rate in a predetermined direction upon heating by said heating means during a toasting cycle, said first bimetal element being mounted on said support member for movement therewith and being bendable when heated in a direction opposite said first direction of movement of said support member, and normally being positioned for maintaining said latch release means in said set position, said second bimetal element being positioned for limiting the pivotal movement of said support member in said first direction and being bendable when heated in a direction such that said support member is permitted to be moved in said first direction, and locking means mounted adjacent said support member, movable between a first unlocked position, out of engagement with said support member to a second locked position, into engagement with said support member in response to the movement of said bread carrier from said nontoasting to said toasting position for securing said support member against movement in said first direction, said locking means releasing said support member for movement in response to the movement of said bread carrier to said nontoasting position, said latch release means being movable to said released position upon said first bimetal element bending a predetermined amount in said first direction of movement of said support member, whereby said latch means is operable to release said bread carrier for movement from said toasting to said nontoasting position, said latch release means being returned to said set position and said locking means being movable to said unlocked position to release said support member for movement in said first direction in response to the release of said bread carrier, whereby said support member is repositioned in accordance with the bending of said second bimetal element thereby to reposition said first bimetal element for maintaining said latch release means in said set position in preparation for a subsequent toasting cycle.

13. A temperature sensitive timing device as claimed in claim 12 wherein said second bimetal element is mounted on said support member for movement therewith, and further including limiting means engagaeble with said second bimetal element for limiting the movement of said support member in said first direction, said second bimetal element being bendable when heated at said predetermined rate in a direction away from said limiting means.

14. A temperature sensitive timing device as claimed in claim 12 wherein said support member is mounted for pivotal movement in said first and second directions and wherein said locking means includes a member normally biased away from said support member, movable into engagement therewith for securing said support member in a predetermined position, said locking member being engageable by said bread carrier in response to the latter being moved to said toasting position for urging said member into locking engagement with said support member, said locking member being released for movement out of engagement with said support member upon release of said bread carrier for movement to said nontoasting position.

* * * * *